(12) United States Patent
Gotkis et al.

(10) Patent No.: US 7,205,166 B2
(45) Date of Patent: Apr. 17, 2007

(54) METHOD AND APPARATUS OF ARRAYED, CLUSTERED OR COUPLED EDDY CURRENT SENSOR CONFIGURATION FOR MEASURING CONDUCTIVE FILM PROPERTIES

(75) Inventors: Yehiel Gotkis, Fremont, CA (US); Rodney Kistler, Los Gatos, CA (US); Aleksander Owczarz, San Jose, CA (US); Charles Freund, Austin, TX (US)

(73) Assignee: Lam Research Corporation, Fremont, CA (US)

( * ) Notice: Subject to any disclaimer, the term of this patent is extended or adjusted under 35 U.S.C. 154(b) by 548 days.

(21) Appl. No.: 10/749,531

(22) Filed: Dec. 30, 2003

(65) Prior Publication Data

US 2004/0206455 A1    Oct. 21, 2004

Related U.S. Application Data

(63) Continuation-in-part of application No. 10/186,932, filed on Jun. 28, 2002, now Pat. No. 6,808,590.

(51) Int. Cl.
*H01L 21/66* (2006.01)
(52) U.S. Cl. .................... 438/14; 438/17; 257/E23.243
(58) Field of Classification Search ............. 438/14–18
See application file for complete search history.

(56) References Cited

U.S. PATENT DOCUMENTS

| | | | |
|---|---|---|---|
| 3,815,016 A | 6/1974 | Nix et al. | |
| 4,556,845 A | 12/1985 | Strope et al. | |
| 5,473,247 A | 12/1995 | You et al. | |
| 5,485,082 A | 1/1996 | Wisspeintner et al. | |
| 5,559,428 A | 9/1996 | Li et al. | |
| 5,660,672 A | 8/1997 | Li et al. | |
| 5,731,697 A | 3/1998 | Li et al. | |
| 5,889,401 A | 3/1999 | Jourdain et al. | |
| 5,900,645 A * | 5/1999 | Yamada ....................... 257/48 |

(Continued)

FOREIGN PATENT DOCUMENTS

EP     0 370 691     5/1990

(Continued)

*Primary Examiner*—H. Jey Tsai
(74) *Attorney, Agent, or Firm*—Martine Penilla & Gencarella, LLP

(57) ABSTRACT

A method for minimizing measuring spot size and noise during film thickness measurement is provided. The method initiates with locating a first eddy current sensor directed toward a first surface associated with a conductive film. The method includes locating a second eddy current sensor directed toward a second surface associated with the conductive film. The first and second eddy current sensors may share a common axis or be offset from each other. The method further includes alternating power supplied to the first eddy current sensor and the second eddy current sensor, such that the first eddy current sensor and the second eddy current sensor are powered one at a time. In one aspect of the invention, a delay time is incorporated between switching power between the first eddy current sensor and the second eddy current sensor. The method also includes calculating the film thickness measurement based on a combination of signals from the first eddy current sensor and the second eddy current sensor. An apparatus and a system are also provided.

8 Claims, 16 Drawing Sheets

U.S. PATENT DOCUMENTS

| | | |
|---|---|---|
| 5,926,020 A | 7/1999 | Samson |
| 6,072,313 A | 6/2000 | Li et al. |
| 6,165,057 A | 12/2000 | Gill, Jr. |
| 6,265,870 B1 | 7/2001 | Weischedel |
| 6,291,992 B1 | 9/2001 | van Andel et al. |
| 6,338,667 B2 | 1/2002 | Sandhu et al. |
| 6,387,807 B1 | 5/2002 | Faubert et al. |
| 6,563,308 B2 | 5/2003 | Nagano et al. |
| 6,808,590 B1 | 10/2004 | Gotkis et al. |
| 2003/0066200 A1 | 4/2003 | Hellstrom |

FOREIGN PATENT DOCUMENTS

| | | |
|---|---|---|
| EP | 0 459 441 | 12/1991 |
| GB | 1 452 417 | 10/1976 |
| WO | WO 91/15733 | 10/1991 |

* cited by examiner

US 7,205,166 B2

METHOD AND APPARATUS OF ARRAYED, CLUSTERED OR COUPLED EDDY CURRENT SENSOR CONFIGURATION FOR MEASURING CONDUCTIVE FILM PROPERTIES

CROSS REFERENCE TO RELATED APPLICATION

This application is a continuation-in-part of U.S. patent application Ser. No. 10/186,932 entitled "METHOD AND APPARATUS OF ARRAYED SENSORS FOR METROLOGICAL CONTROL," filed on Jun. 28, 2002 now. U.S. Pat. No. 6,808,590. This application is related to U.S. patent application Ser. No. 10/186,472, entitled "INTEGRATION OF EDDY CURRENT SENSOR BASED METROLOGY WITH SEMICONDUCTOR FABRICATION TOOLS," filed on Jun. 28, 2002. The disclosures of these related applications are incorporated herein by reference.

BACKGROUND OF THE INVENTION

The invention relates generally to semiconductor fabrication and more specifically to in-line metrology for process control during wafer processing.

During semiconductor fabrication a there are multiple steps where an underlying substrate is subjected to the formation and removal of various layers. The small feature sizes, tight surface planarity requirements, combined with the constant quest to increase throughput, makes it highly desirable to stop the process when the correct thickness has been achieved, i.e., when an endpoint has been obtained for the process step.

Eddy current sensors are used for displacement, proximity and film thickness measurements. The sensors rely on the induction of current in a sample by the fluctuating electromagnetic field of a probing coil proximate to the object being measured. Fluctuating electromagnetic fields are created as a result of passing an alternating current through the coil. The fluctuating electromagnetic fields induce eddy currents which perturb the primary field and, as a result, change the coils inductance.

FIG. 1 is a simplified schematic diagram of the principle upon which an eddy current sensor operates. An alternating current flows through coil 100 in close proximity to conducting object 102. The electromagnetic field of the coil induces eddy currents 104 in conducting object 102. The magnitude and the phase of the eddy currents in turn effect the loading on the coil. Thus, the impedance of the coil is impacted by the eddy currents, induced in the nearby located conducting objects. This impact is measured to sense the proximity of conducting object 102 as well as a thickness of the object. Distance 106 impacts the effect of eddy currents 104 on coil 100, therefore, if object 1002 moves, the signal from the sensor monitoring the impact of eddy currents on coil 100 will also change.

Attempts to use eddy current sensors to measure thickness of a film has resulted in limited success. Since the signal from the eddy current sensor is sensitive to both the thickness of the film and distance of the substrate to the sensor, there are two unknowns that must be resolved. FIG. 2 is a schematic diagram of a wafer carrier having an eddy current sensor for measuring the thickness of a wafer during a chemical mechanical planarization process (CMP). Wafer carrier 108 includes eddy current sensor 110. During a CMP operation, wafer 114 supported by carrier film 112 of carrier 108 is pressed against pad 116 to planarize a surface of the wafer. Pad 116 is supported by stainless steel backing 118.

One shortcoming of the configuration of FIG. 2 comes from the variability of the carrier film, which can vary by +/−3 mils. Thus, the carrier film causes a substantial variability in the distance between the wafer and the sensor. Additionally, different down forces applied to the carrier film will cause further variation as the carrier film compresses. Accordingly, it becomes extremely difficult to calibrate for all the variables that effect the distance, which in turn impacts the thickness measurement of the sensor. Another shortcoming of this configuration is caused by the presence of another conducting material separate from the conducting material being measured and is commonly referred to as a third body effect. If the thickness of the conductive layer is less than the so-called skin depth, the electromagnetic field from the coil will not be completely absorbed and will partially pass through to stainless steel backing 118 of pad 116 of FIG. 2. It will induce additional eddy currents within the stainless steel belt, thereby contributing to the total signal from the eddy current sensor. Furthermore, it should be appreciated that the pad wears or erodes over time, causing variation in the distance between the stainless steel backing and the eddy current sensor, which influences the appropriated contribution to the total eddy current sensor signal. Thus, a wear factor has to be considered as the wafers are continuously being processed. Consequently, due to the variability injected into the thickness measurement, the amount of error is unacceptably high and unpredictable.

In view of the foregoing, there is a need to eliminate or offset the variability inherent under working conditions so that an accurate endpoint can be determined to more precisely achieve a desired thickness.

SUMMARY OF THE INVENTION

Broadly speaking, the present invention fills these needs by determining a thickness of the wafer under ideal conditions, i.e., non-working conditions, and providing that thickness so that the variability due to unknowns introduced during the processing operation can be accounted for or offset.

In accordance with one embodiment of the present invention, a method for minimizing noise during film thickness measurement is provided. The method initiates with locating a first eddy current sensor directed toward a first surface associated with a conductive film. The method includes locating a second eddy current sensor placed at the alternative side of the conductive film and directed toward the second surface associated with the conductive film. The first and second eddy current sensors may share a common axis or be offset from each other. The method further includes alternating power supplied to the first eddy current sensor and the second eddy current sensor, such that the first eddy current sensor and the second eddy current sensor are powered one at a time. In one aspect of the invention, a delay time is incorporated between switching power between the first eddy current sensor and the second eddy current sensor. The method also includes calculating the film thickness measurement based on a combination of signals from the first eddy current sensor and the second eddy current sensor.

In another embodiment, a sensor array for mapping a wafer thickness is provided. The sensor array includes a plurality of top sensors and a plurality of bottom sensors opposed to the top sensors. Each of the plurality of bottom sensors is coaxial with a corresponding one of the plurality of top sensors. The plurality of bottom sensors are further configured to be passive when the corresponding one of the plurality of top sensors are active. A power supply in communication with both the plurality of top sensors and the plurality of bottom sensors is included. A controller configured to alternate power from the power supply to the plurality of bottom sensors and the plurality of top sensors is also included.

In accordance with yet another embodiment of the present invention, a system for processing a wafer is provided. The system includes a chemical mechanical planarization (CMP) tool. The CMP tool includes a wafer carrier defined within a housing. The wafer carrier has a bottom surface having a window defined therein. A carrier film is affixed to the bottom surface of the wafer carrier. The carrier film is configured to support a wafer during CMP operations. A sensor is embedded in the wafer. The sensor is disposed over a top surface of the window. The sensor is configured to induce an eddy current in the wafer to determine a proximity and a thickness of the wafer. A sensor array external to the CMP tool is provided. The sensor array is in communication with the sensor embedded in the wafer carrier. The sensor array includes a first sensor and a corresponding second sensor. The first sensor and the corresponding second sensor are configured to alternate between an active state and a passive state. The first sensor is further configured to be in an active state when the second sensor is in a passive state. The sensor array is configured to detect a wafer thickness signal that is independent of a distance of the first sensor and the corresponding second sensor to the wafer.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

Figure 1:
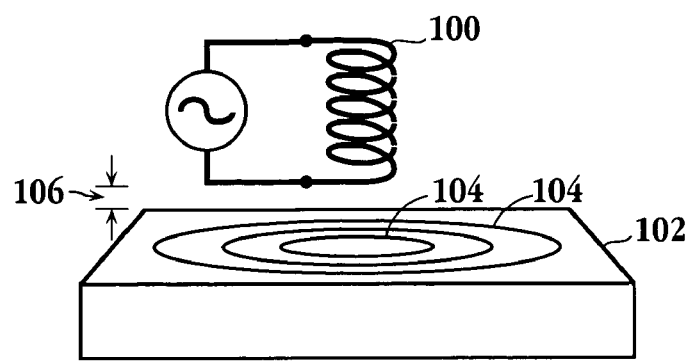
FIG. 1 is a simplified schematic diagram of the principle upon which an eddy current sensor operates.
Figure 2:
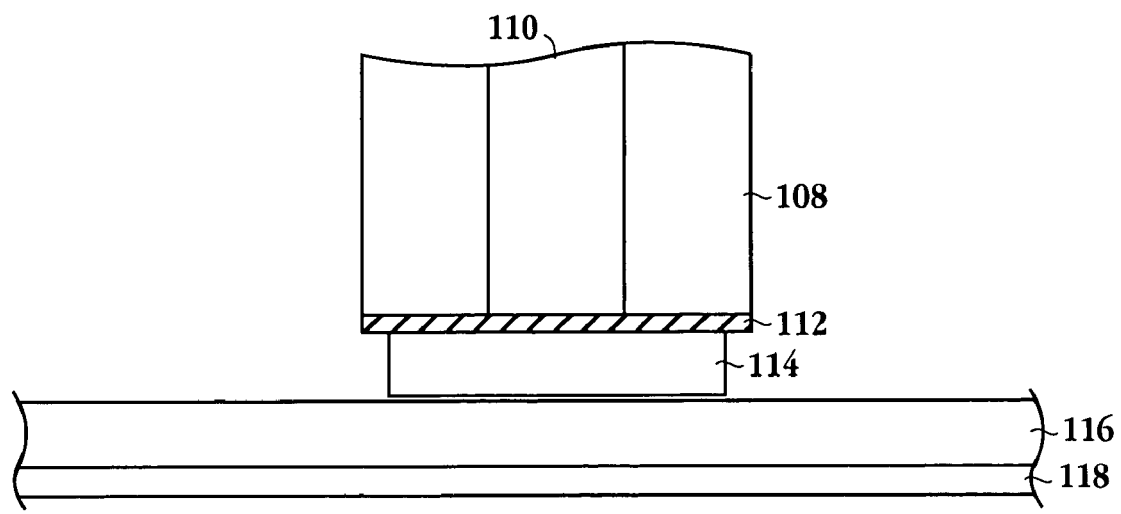
FIG. 2 is a schematic diagram of a wafer carrier having an eddy current sensor for measuring the thickness of a wafer during a chemical mechanical planarization process (CMP).

Several exemplary embodiments of the invention will now be described in detail with reference to the accompanying drawings. FIGS. 1 and 2 are discussed above in the "Background of the Invention" section.

Eddy current sensors (ECS) allow for measuring a metal film thickness of a moving wafer. It has been determined that ECS are capable of providing a fast enough response for a wafer moving under typical loading robotics velocity. Therefore, it is possible to perform the thickness measurements "on the fly" without impacting process throughput. Moreover, the movement of the wafer can be taken advantage of to produce a thickness profile from a limited number of sensors in a cluster configuration. For example, wafer aligners provide movement in a rotational direction and a linear radial direction. Accordingly, a cluster of sensors can capture a thickness profile of a wafer while the wafer is undergoing common automated wafer handling schemes. In one embodiment, a thickness profile can be generated for each wafer so that a recipe of a downstream process can be optimized for the thickness profile.

The Figures below initially provide configurations for an incoming sensor or sensor cluster that determines the thickness of a wafer under non-process conditions, i.e., non-disturbing conditions. This thickness can then be stored and/or communicated to downstream fabrication processes dealing with thin metal films. That is, the incoming thickness can be supplied to a similar thickness measuring device for the downstream fabrication process. The sensor associated with the downstream fabrication process can then be calibrated with the incoming thickness to make the unknowns or variables resulting from the processing conditions irrelevant. It should be appreciated that a cluster of sensors refers to the combination of two or three sensors to define a new metrological property. In one embodiment, the sensors are joined into clusters to remove sensitivity to distance. Sample results of data gathered with the sensor configurations are also provided herein. An array of sensors as used herein includes two or more clusters of sensors joined to cover, i.e., map, a larger area of a wafer. Additionally, three sensors located on the same side of a wafer can be considered an array.

When integrating the clustered sensor with a pre-existing station the thickness of the wafer can be mapped and stored for a downstream processing operation. In addition, when the wafers are removed from the processing chamber the thickness of the processed wafer can also be scanned to provide feedback as to the results of the processing operation. Accordingly, adjustments can be made to the recipe of the operation based on the feedback. Of course, the post processing results can be provided for further processing operations also.

Figure 3:
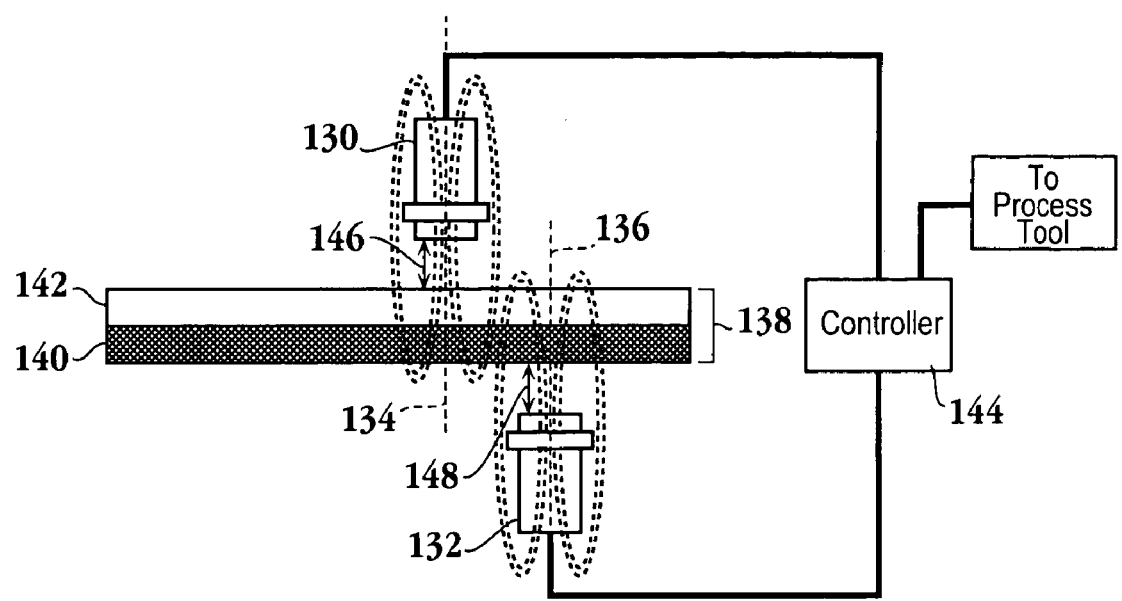
FIG. 3 is a simplified schematic diagram of coupled sensors for measuring thickness of an incoming wafer in accordance with one embodiment of the invention.

FIG. 3 is a simplified schematic diagram of coupled sensors for measuring thickness of an incoming wafer in accordance with one embodiment of the invention. Top sensor 130 and bottom sensor 132 are configured to provide a signal indicating a thickness of wafer 138. In one embodiment, sensors 130 and 132 are eddy current sensors. Wafer 138 includes substrate 142 and metal layer 140. Axis 134 of top sensor is offset from axis 136 of bottom sensor 132. One skilled in the art will appreciate that by offsetting top sensor 130 and bottom sensor 132, where both sensors are eddy current sensors, the electromagnetic field produced by sensors 130 and 132 will not interfere, i.e., suppress each other. Where the frequencies are the same and axis 134 is aligned with axis 136 then suppression of the signals can occur in certain situations, however, as will be explained below adjustments can be made to avoid suppression of the signals. Controller 144 is in communication with sensors 132 and 134. In one embodiment, controller 144 is configured to receive signals from sensors 132 and 134 and determine a thickness of wafer 138. It should be appreciated that controller 144 averages the signals from sensor 130 and 132 to arrive at a signal indicating a thickness of the wafer. Furthermore, by providing top sensor 130 and bottom sensor 132 a change in distance 146 between the top sensor and a top surface of wafer 138 or a change in distance 148 between the bottom sensor and a bottom surface of wafer 138 are cancelled out. That is, a change in either distance when both the sensors are stationary is offset by the averaging of the readings so that the signal is now a function of thickness rather than thickness and proximity. In another embodiment, controller 144 communicates the calculated thickness to a downstream tool, such as a CMP tool, so that the downstream process can optimize the process settings, such as pressure of the down force applied and belt speed, based upon the incoming thickness of the wafer.

Figure 4:
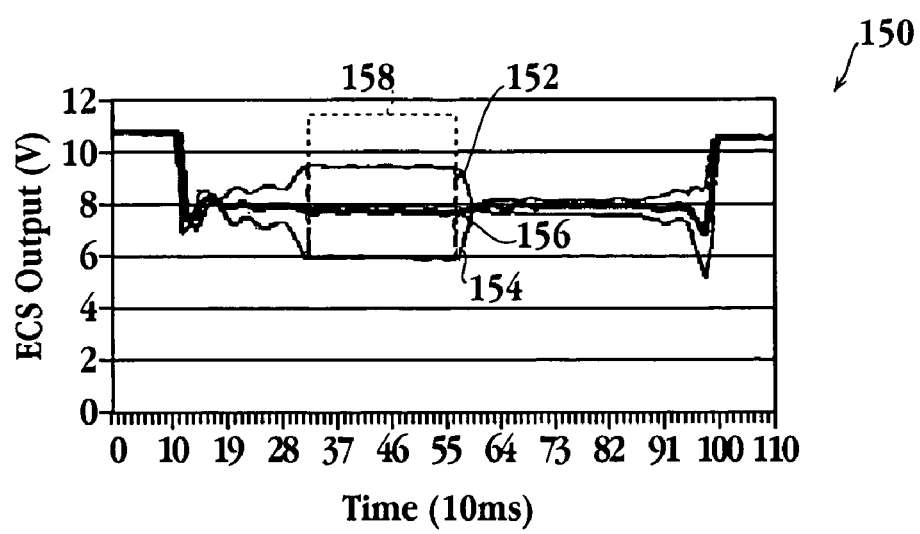
FIG. 4 is a graph of the signal of coupled eddy current sensors configured as in FIG. 3 in accordance with one embodiment of the invention.

FIG. 4 is a graph of the signal from coupled eddy current sensors configured as in FIG. 3 in accordance with one embodiment of the invention. Graph 150 plots an eddy current sensor output in volts versus time. Line 152 represents the signal from a sensor located below a wafer such as bottom sensor 132 of FIG. 3. Line 154 represents the signal from a sensor located above the wafer such as top sensor 130 of FIG. 3. Bold line 156 represents the average of lines 152 and 154. It will be apparent to one skilled in the art that line 156 provides a substantially constant signal. That is, by combining a signal from the top sensor with a signal from a bottom sensor, the dependence of the signal on the distance of the sensor is eliminated. For example, as wafer 138 of FIG. 3 moves closer to top sensor 130, the signal increases. Region 158 exemplifies the movement of the wafer closer to the top sensor. Thus, the signal intensity from the top sensor increases accordingly as illustrated by line 152 in region 158. At the same time, the wafer is moving away from the bottom sensor. Therefore, the signal intensity from the bottom sensor decreases similar to the increase of the signal intensity from the top sensor, as illustrated by line 154 in region 158. Consequently, an average of the top and bottom signal intensity stays constant. Since the signal intensity is linearly related to the distance of the sensor to the object, a change in signal intensity caused by movement of the object toward a first stationary sensor is offset by an opposite change in intensity caused by movement of the object away from a second stationary sensor. In turn, the sensitivity of the signal intensity to distance is eliminated.

Thus, by clustering a sensor or clusters of sensors with a sensor operating under working conditions, such as a sensor embedded in a wafer carrier of a CMP tool, the sensor operating under working conditions can be calibrated to more accurately provide information regarding the removal rate and process endpoint. That is, an accurate measurement of an incoming film thickness or wafer thickness is provided so that inaccuracies caused under processing conditions can be compensated through a calibration setting. Furthermore, the sensor cluster can be utilized as a run-to-run process control where a wafer has a thickness profile that is mapped by a first sensor or cluster of sensors and the profile is downloaded into a controller of the process tool to customize the process, such as a CMP process, to remove the correct amount of film thickness.

Figure 5:
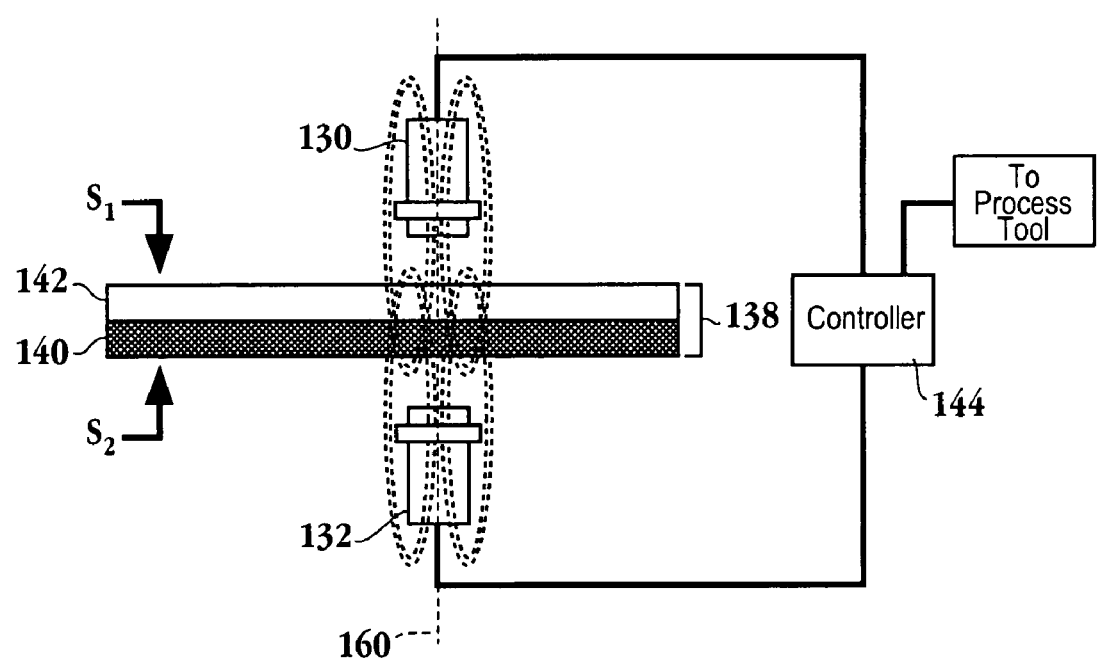
FIG. 5 is a simplified schematic diagram of an alternative configuration of coupled sensors for measuring an incoming thickness of a wafer or film in accordance with one embodiment of the invention.

FIG. 5 is a simplified schematic diagram of an alternative configuration of coupled sensors for measuring an incoming thickness of a wafer or film in accordance with one embodiment of the invention. Here, top sensor 130 and bottom sensor 132 share the same vertical axis 160. In order to eliminate any interference or suppression of the signals between the top and bottom sensors a different frequency can be applied for each of the respective sensors. Additionally, a phase shift can be applied so that the two sensors are out of phase. That is, one sensor overturns a wave of the signal by 180 degrees to eliminate suppression of the signal. Since distance is eliminated as a variable here as described above, the signal intensity is a function of thickness. Stated as a mathematical equation: $S=k(THK)$, where S is the signal intensity, k is the sensitivity coefficient and THK is the thickness. Where the signal intensity and the sensitivity coefficient are known for the above equation, the thickness can be determined through a calibration curve, in one embodiment. This determined thickness can be supplied to a downstream process tool dealing with thin metal films in a semiconductor fabrication process, such as a CMP tool as discussed with reference to FIGS. 8 and 9. Additionally, a switched powerizing scheme, discussed in more detail with reference to FIGS. 13–16B, may be applied. Therefore, single power supply 145 may be used to power both of sensors 130 and 132. Of course, the single power supply may be applied to a switched powerizing scheme where the sensors are offset as in FIG. 3.

Figure 6A:
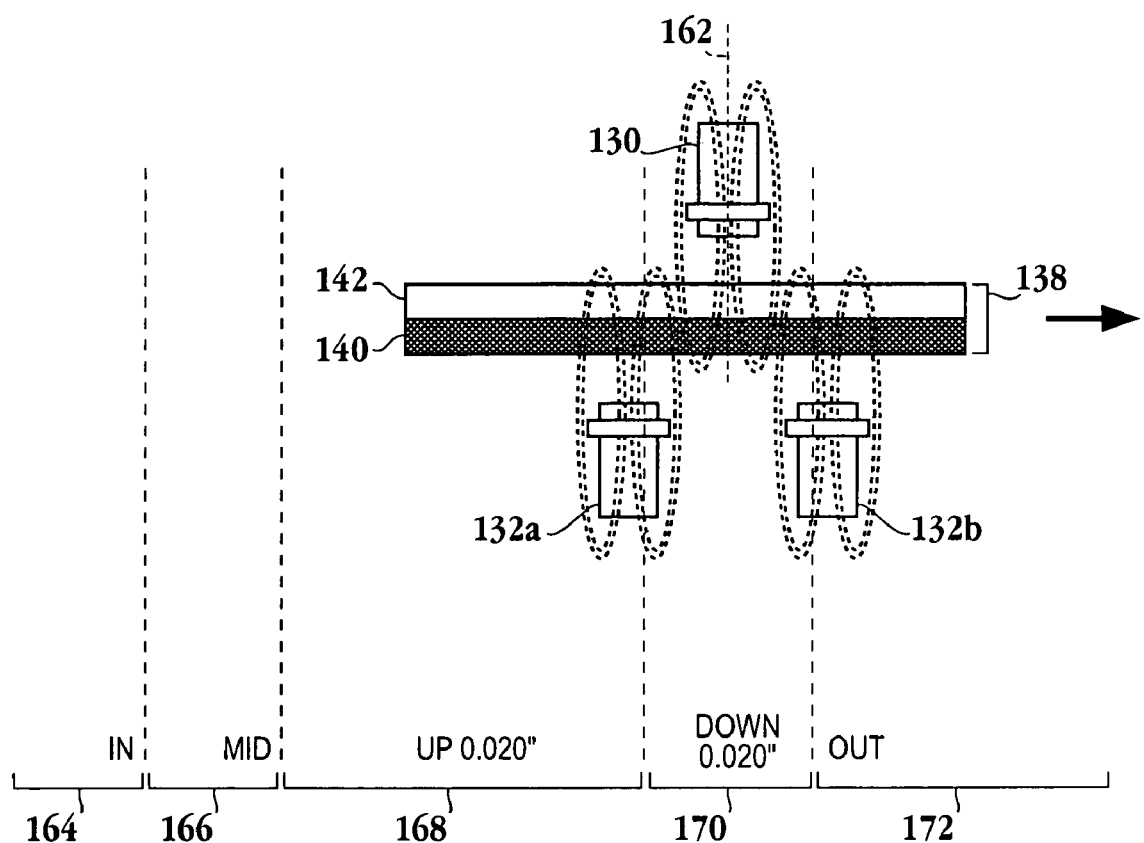
FIG. 6A is a simplified schematic diagram of another alternative configuration of coupled sensors for measuring thickness of an incoming wafer in accordance with one embodiment of the invention.

FIG. 6A is a simplified schematic diagram of another alternative configuration of coupled sensors for measuring thickness of an incoming wafer in accordance with one embodiment of the invention. In this embodiment, the sensor cluster is configured to determine the thickness of wafer 138 along axis 162 of top sensor 130. Bottom sensors 132a and 132b are positioned such that a distance from each sensor to axis 162 is the same. Thus, by averaging the signals from sensors 132a and 132b, the signal, and consequently the thickness, along axis 162 is determined. Here, interference or suppression of the signals between the top and bottom sensors is not a concern as bottom sensors 132a and 132b are offset from an axis of top sensor 130. Regions 164, 166, 168, 170 and 172 denote movement of wafer 138 as the wafer passes through a space defined between top sensor 130 and bottom sensors 132a and 132b. The significance of these regions are described in greater detail with reference to FIG. 6B.

Figure 6B:
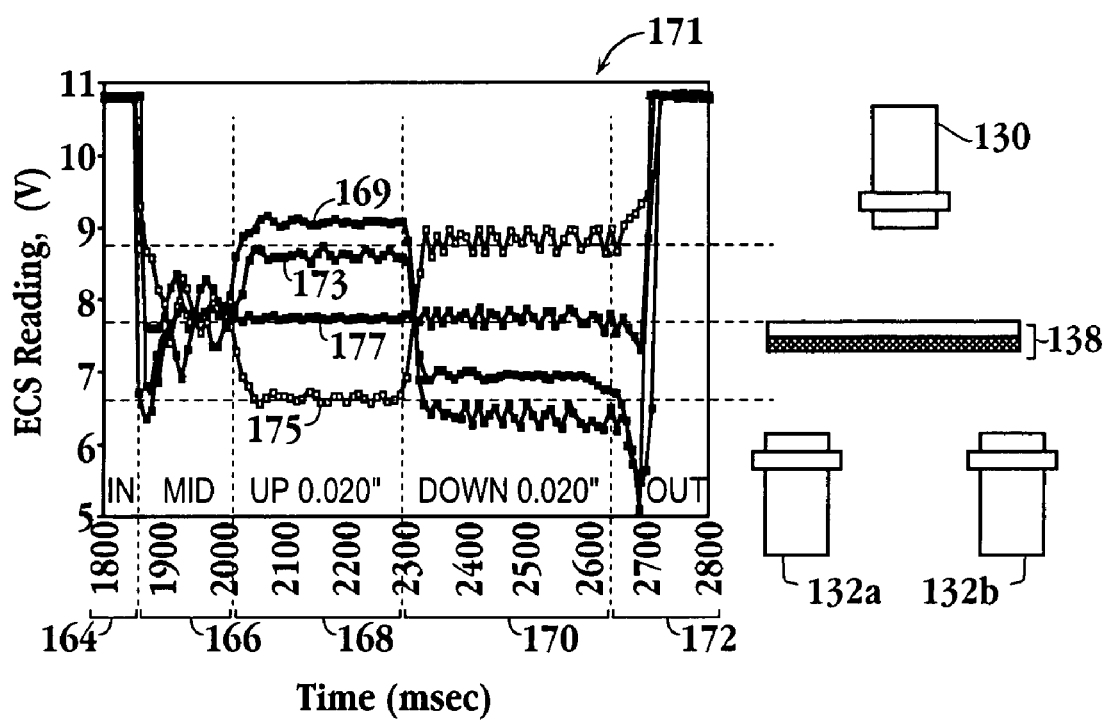
FIG. 6B is a graph illustrating the stability of an average signal when using an eddy current sensor array as configured to the side of the graph for detecting a film thickness in accordance with one embodiment of the invention.

FIG. 6B is a graph illustrating the stability of an average signal when using an eddy current sensor cluster as configured to the side of the graph for detecting a film thickness in accordance with one embodiment of the invention. In this configuration, eddy current sensor cluster includes a top sensor 130 and two bottom sensors 132a and 132b. Wafer 138 travels between top sensor 130and bottom sensors 132a and 132b. Graph 171 plots the ECS readings in volts versus the time in milliseconds. Line 169 represents the reading from sensor 132a, while line 173 represents the reading from sensor 132b. Line 175 represents the reading from top sensor 130. In one embodiment, the signals from sensors 132a and 132b are averaged. This result is then averaged with the signal from sensor 130. The final averaged signal is represented by line 177. Graph 171 illustrates the various positions of wafer 138 as it passes through the sensor cluster. For example, wafer 138 comes into the sensor cluster and is represented on the graph by region 164. It should be appreciated that the ECS reading of 11 volts represents a starting point corresponding to a thickness of 0 as the wafer is not being measured here. The signals stabilize as the wafer edge passes through the sensor cluster. Then, the wafer continues along this midpoint travel path as represented in region 166. As can be seen, the average reading represented by line 177 stays relatively steady.

Next, the wafer is moved up by 0.020 inches. While the signal intensity, i.e., a difference between the measured signal and the reference signal at 0 thickness, from top sensor 130 becomes stronger, the signal intensity from bottom sensors 132a and 132b becomes weaker. However, the average represented by line 177 remains relatively constant. The wafer is then moved down 0.020 inches from the midpoint path. Accordingly, the signal intensity from top sensor 130 becomes weaker, while the signal intensity from bottom sensors 132a and 132b becomes stronger. As above, the average of the top sensor signal and the bottom sensor signal remains relatively constant. Thus, as mentioned above, the sensor cluster supplies a stable signal where the distance of the wafer from the sensor is irrelevant as the average of a top and bottom signal offsets variability from the wafer moving or even variation of the signal from wafer warping. Wafer 138 then moves out of the sensor cluster as depicted in region 172 where the signals vary as the sensors see the edge of the wafer upon exit. It should be appreciated that regions 164–172 of FIG. 6A represent a similar pattern of movement as described with respect to FIG. 6B. A graph of the movement of FIG. 6A would yield a substantially constant average signal as in FIG. 6B. One skilled in the art will appreciate that the sensors can be configured with one bottom sensor and one top sensor, one bottom sensor and two bottom sensors, or any other suitable configuration to offset the movement of the wafer so that a stable reading is maintained.

Figure 7A:
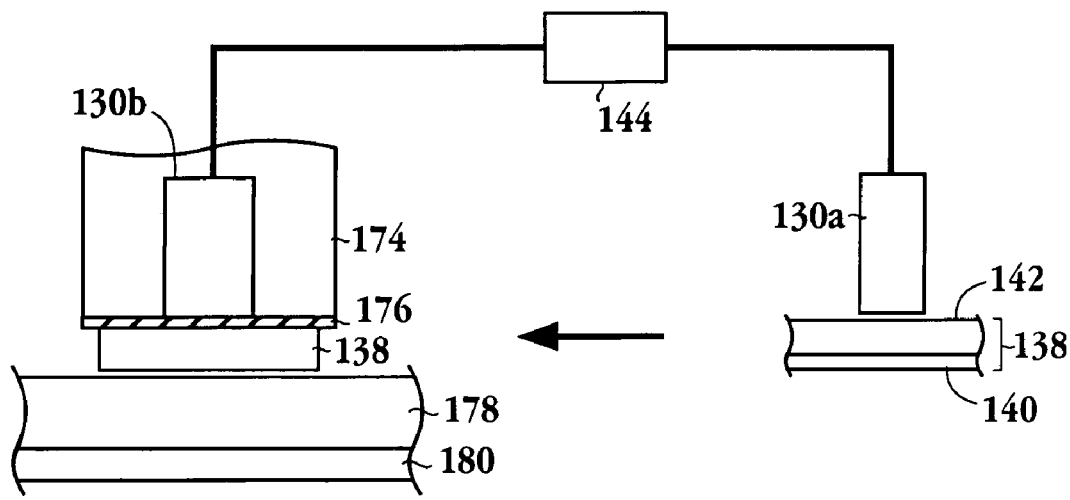
FIG. 7A is a simplified schematic diagram of an incoming thickness sensor coupled to a downstream CMP process thickness sensor in accordance with one embodiment of the invention.

FIG. 7A is a simplified schematic diagram of an incoming thickness sensor coupled to a downstream CMP process thickness sensor in accordance with one embodiment of the invention. Here, incoming thickness sensor 130a determines a thickness of the wafer and/or thin film 140 over substrate 142 of wafer 138. The signal indicating the determined thickness is communicated to controller 144. In turn, controller 144 communicates the signal to sensor 130b, which is embedded in wafer carrier 174 for a CMP process. In one embodiment sensors 130a and 130b are eddy current sensors. In another embodiment, sensors 130a and 130b are infrared sensors. It should be appreciated that by providing sensor 130b with the thickness of incoming wafer 138, a calibration can be performed to substantially eliminate the sensitivity to the distance between the sensor and the wafer. The variability in the distance between sensor 130b and wafer 138 can be caused by carrier film 176 compressing during working conditions or just due to the inherent variation of the thickness of the carrier film, which can be as great as +/−3 millimeters. Additionally, the distance between the top of polishing pad 178 and stainless steel backing 180 impacts the signal from sensor 130b. Again, the signal indicating the thickness of incoming wafer 138 can be used to calibrate sensor 130b to substantially eliminate variability caused by polishing pad tolerances and pad erosion that impact the distance between the top of polishing pad 178 and stainless steel backing 180.

Figure 7B:
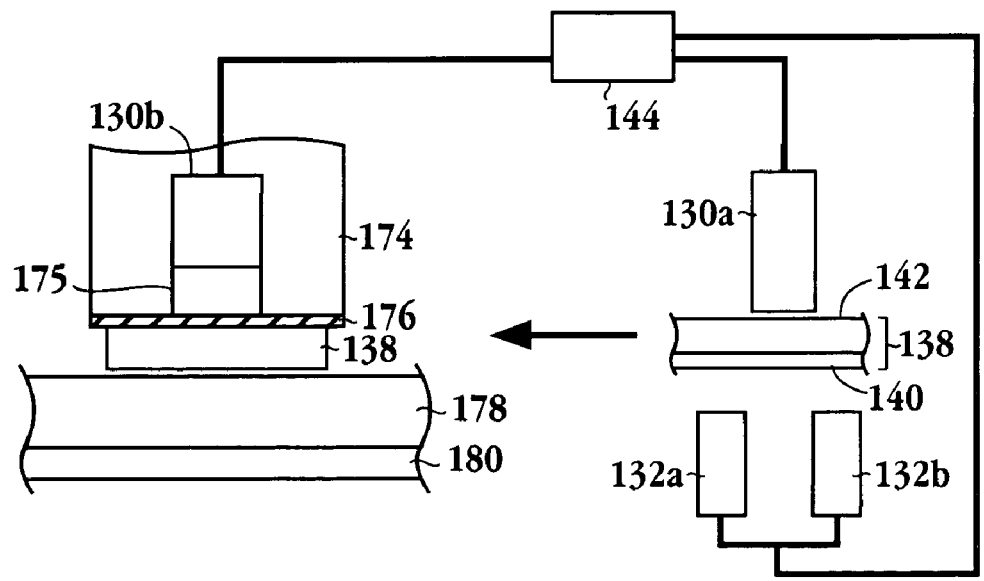
FIG. 7B is a simplified schematic diagram of an alternative embodiment of an incoming thickness sensor coupled to a downstream CMP process thickness sensor.

FIG. 7B is a simplified schematic diagram of an alternative embodiment of an incoming thickness sensor coupled to a downstream CMP process thickness sensor. In FIG. 7B, a sensor cluster consisting of top sensor 130a and bottom sensors 132a and 132b, is in communication with controller 144. Here, a suitable sensor cluster, such as the sensor cluster of FIGS. 6A and 6B, is provided to determine the incoming thickness of wafer 138 or of thin film 140 of the wafer. One skilled in the art will appreciate that the sensor cluster with reference to FIGS. 3 and 5 are suitable sensor clusters that can also be used to determine the thickness of wafer 138. In one embodiment, controller 144 averages the signal from bottom sensors 132a and 132b in order to determine a thickness signal for the thickness of wafer 138 along an axis of top sensor 130a through the wafer. The averaged signal of the bottom sensors is then averaged with the signal from top sensor 130a to determine a thickness of wafer 138 or thin film 140. This thickness is then communicated to embedded sensor 130b. As mentioned above with reference to FIG. 7A, an auto calibration can be performed for sensor 130b where the sensitivity to the distance between the sensor and wafer 138 and the sensitivity to the distance between the top of polishing pad 178 and stainless steel backing 180 are substantially eliminated. That is, the auto calibration can be performed in real-time to adjust the ECS readout for variation in sensor proximity due to pad-wear or other mechanical drift issues with the CMP carrier-to-plates mechanical displacements.

Sensor 130b of FIG. 7B is disposed over spacer 175. Spacer 175 is aligned with the bottom surface of wafer carrier 174. Spacer 175 is composed of any suitable material that is non-conductive. In one embodiment, spacer 175 is a polymer. In another embodiment, spacer 175 is between about 1 millimeter (mm) and about 1.5 mm thick. It should be appreciated that spacer 175 provides a window for sensor 130b to transmit and receive signals indicating the thickness and proximity of a wafer or film on a wafer.

While the embodiments of FIGS. 7A and 7B illustrate a sensor or sensor cluster for pre-CMP processing, a sensor or sensor cluster can also be located post CMP processing to provided information configured to improve run-to-run process control. While the incoming thickness allows for specific recipes to be downloaded to the process tool station to compensate for any incoming film thickness, the post CMP thickness allows for the correction of any detected process variation determined in the post-CMP thickness uniformity measurement. That is, the post-CMP thickness uniformity measurement is provided as feedback to sensor 130b, in order for sensor 130b to further fine tune the calibration settings to obtain an accurate endpoint. In one embodiment, controller 144 provides the feedback to sensor 130b from a post-CMP sensor cluster. In another embodiment, the eddy current sensors are commonly available eddy current sensors, such as GP-A series analog displacement sensors available from SUNX Limited. In another embodiment, multiple sensors can be placed in the wafer carrier of FIGS. 7A and 7B. The multiple sensors can be linked together to detect both wafer proximity and metal film-thickness. For example, a capacitance sensor can be included in the wafer carrier to determine a distance between the wafer and the ECS sensor. As the capacitance sensor is linked to the ECS sensor, the distance can be provided to the ECS sensor.

Figure 8A:
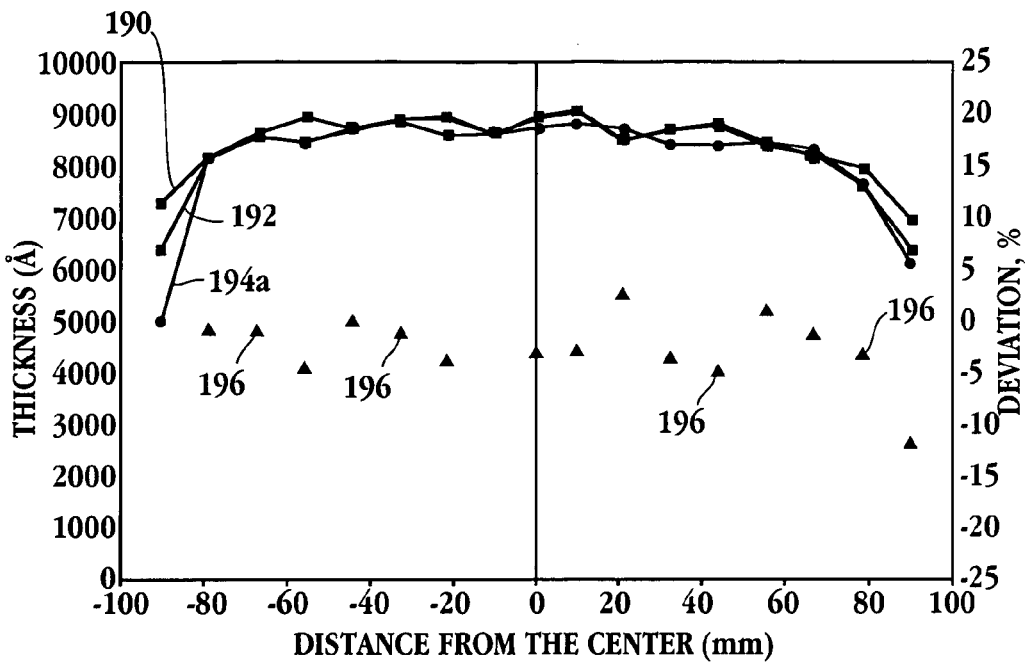
FIGS. 8A and 8B are graphs illustrating the correlation between the signal from an eddy current sensor for a film thickness and a signal from a standard resistivity film thickness measurement device in accordance with one embodiment of the invention
Figure 8B:
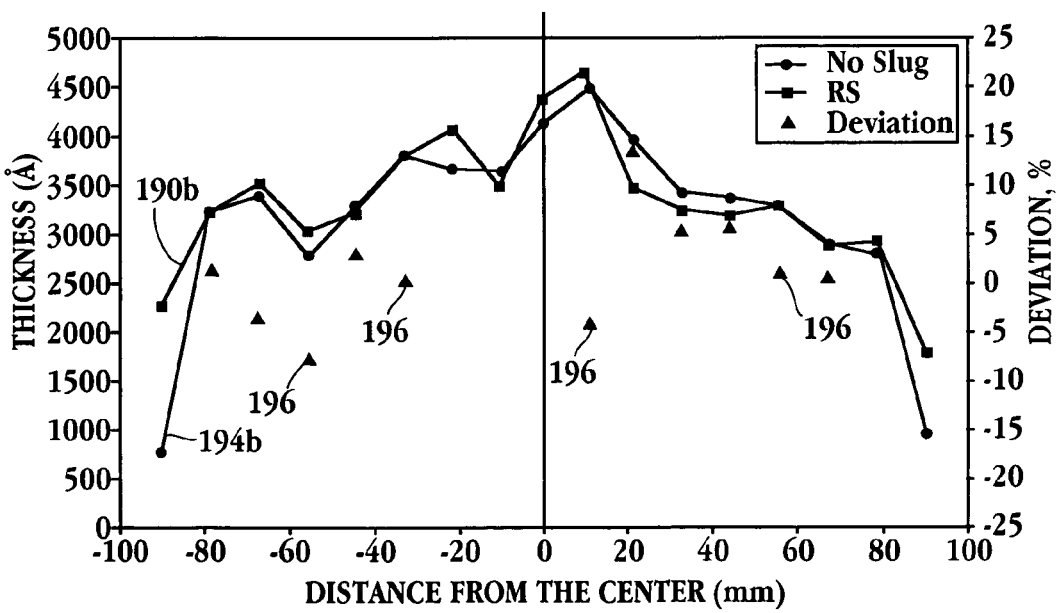

FIGS. 8A and 8B are graphs illustrating the correlation between the signal from an eddy current sensor for a film thickness and a signal from a standard resistivity film thickness measurement device in accordance with one embodiment of the invention. Line 190 of FIG. 8A represents the signal from a typical resistance sensor approach. Line 192 represents the signal from an eddy current sensor in the presence of a third metal body, such as the stainless steel backing of a polishing pad or belt, a wafer carrier, an air bearing platen, etc, of a CMP tool, at different points from the center of the wafer. Line 194a represents the signal from an eddy current sensor without the presence of a third metal body. Thus, the eddy current sensor closely correlates with the signals from a standard four point approach of the resistance measurement. Additionally, the percent deviation is within +/−5%, as illustrated by triangles 196, where each of the triangles corresponds to a difference between respective points on the lines above each of the triangles.

FIG. 8B similarly illustrates eddy current sensor measurements correlated to signals from a typical resistance sensor approach. Here, line 190b represents the signal from a typical resistance sensor approach, while 194b represents the signal from an eddy current sensor without the presence of a third metal body. It should be appreciated that the wafer measured in FIG. 8A is different than the wafer measure in FIG. 8B. Again the ECS signal 194b closely correlates with the RS75 signal. That is, the percent deviation between the signals is generally within +/−5% as illustrated by triangles 196. One skilled in the art will appreciate that the points at the ends of the lines correspond to the edge of the film, i.e., edge of the wafer, and are not considered as relevant.

Figure 9:
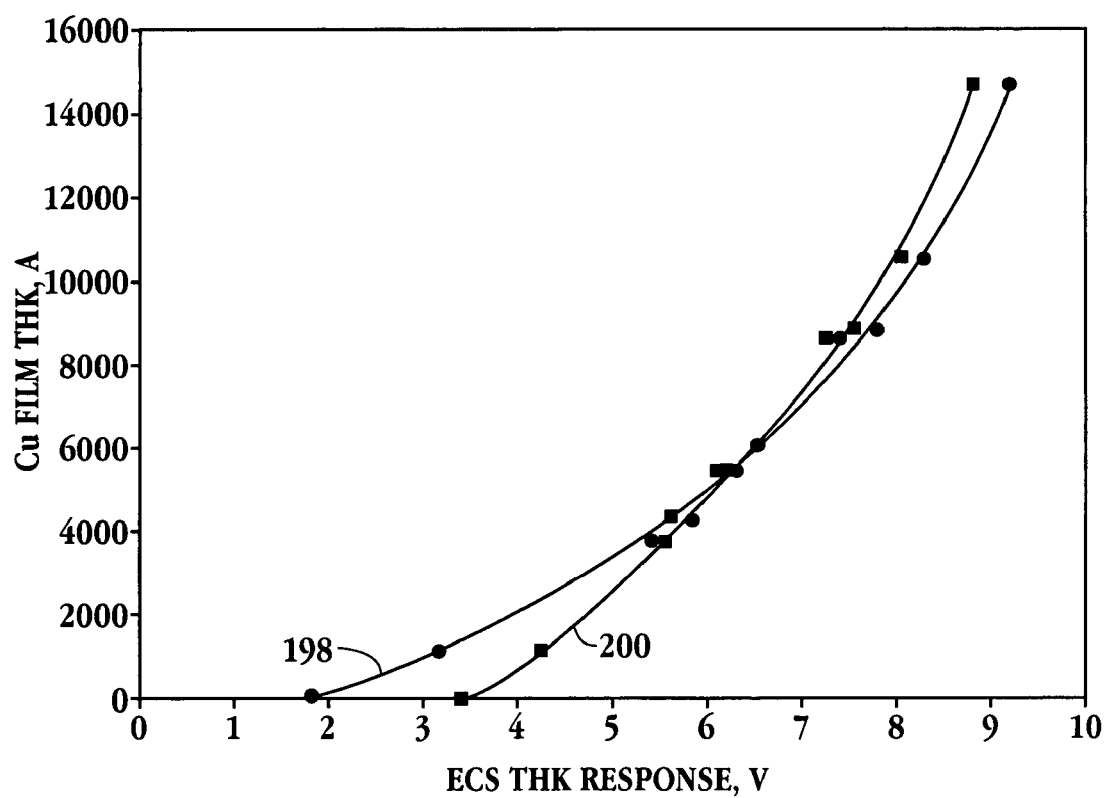
FIG. 9 is a graph illustrating a calibration curve for an eddy current sensor for measuring a copper film thickness in accordance with one embodiment of the invention.

FIG. 9 is a graph illustrating a calibration curve for an eddy current sensor for measuring a copper film thickness in accordance with one embodiment of the invention. Line 198 represents a film thickness of copper and the associated ECS voltage reading for that thickness without the presence of a third metal body. Line 200 represents a film thickness of copper and the associated ECS voltage reading for that thickness in the presence of a third metal body. One skilled in the art will appreciate that the calibration curves can be applied to the sensors described above with reference to FIGS. 3, 5, 6A, 6B, 7A and 7B. Additionally, calibration curves can be generated for any conductive film layer, as copper is described here for illustrative purposes only and not meant to be limiting.

Figure 10:
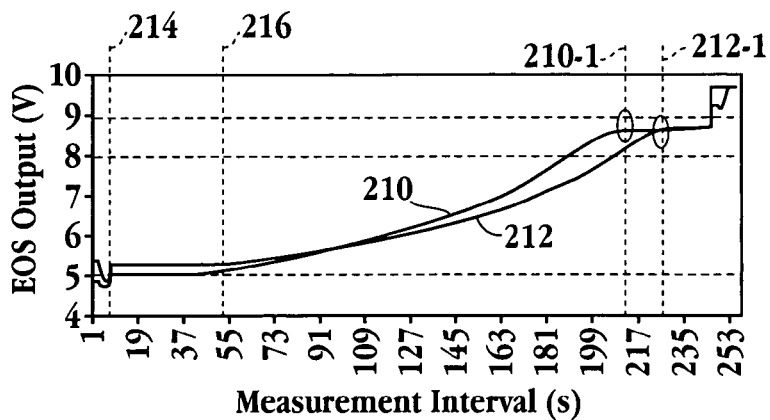
FIG. 10 is a graph illustrating two eddy current sensor output signals during a CMP operation of a copper thin film on a substrate in accordance with one embodiment of the invention.

FIG. 10 is a graph illustrating two eddy current sensor output signals during a CMP operation of a copper thin film on a substrate in accordance with one embodiment of the invention. Line 210 represents the ECS signal over time of the leading edge of the wafer undergoing the CMP operation. Line 212 represents the ECS signal over time of the trailing edge of the wafer undergoing the CMP operation. It should be appreciated that the region defined between line 214 and 216 removes the topography of the wafer, while the region after line 216 removes the copper overburden from the wafer. Point 210-1 represents the endpoint, i.e., clearing of the copper overburden, of the leading edge of the wafer. Point 212-1 represents the endpoint of the trailing edge of the wafer. One skilled in the art will appreciate that the information gathered from the ECS embedded in the wafer carrier will yield continuous data for determining a removal rate. Additionally, the removal rate variation between the leading edge and the trailing edge can be observed. Where the sensor is embedded in the wafer carrier, the sensor provides continuous real time data as to the thickness of the wafer or a film on the wafer being measured. That is, there is not a window where the sensor takes a snapshot once per revolution of a polishing belt or pad which provides discrete measurements. The embodiments described herein provide continuous measurement and thickness monitoring.

Figure 11A:
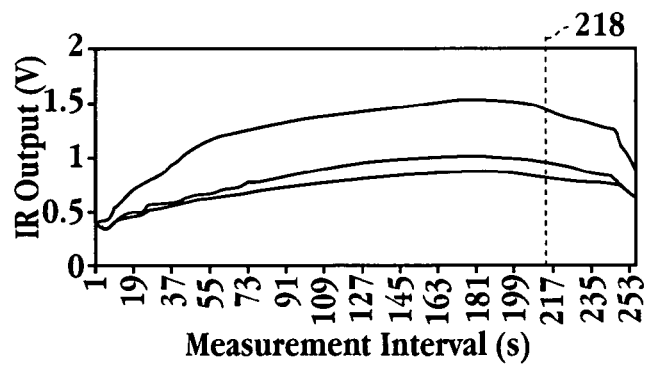
FIG. 11A is a graph of an Infrared (IR) sensor signal measuring the temperature of a polishing belt over time in accordance with one embodiment of the invention.

FIG. 11A is a graph of an infrared (IR) sensor signal measuring the temperature of a polishing belt over time in accordance with one embodiment of the invention. One skilled in the art will appreciate that a silicon substrate is transparent to the infrared signal, therefore, the infrared signal can detect the temperature of the thin film of the wafer being planarized by the surface of the polishing surface. The lines of the graph of FIG. 11A represent the monitoring of the infrared signal at various locations of the belt, such as the center front and back of the belt relative to an operator.

Figure 11B:
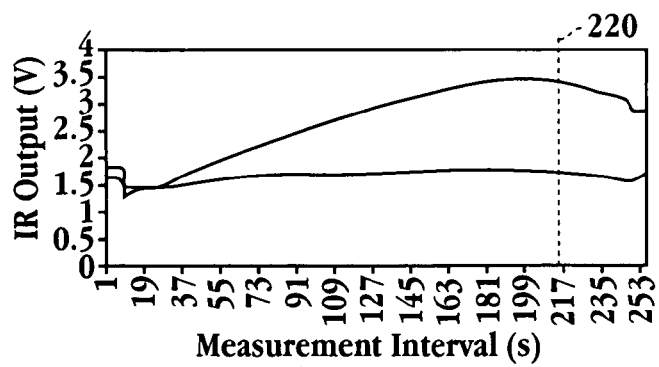
FIG. 11B is a graph of an Infrared signal of the wafer temperature over time in accordance with one embodiment of the invention.

FIG. 11B is a graph of an infrared signal of the wafer temperature over time in accordance with one embodiment of the invention. Here, the wafer temperature is being monitored to monitor temperature variation during CMP process flow. For each of the embodiments of FIGS. 11A and 11B, line 218 and 220, respectively, intersect the response lines of the graphs at the endpoint of the associated processes. That is, the belt temperature and wafer temperature begin to decrease at the endpoint, which is at an inflection point of the curves. In one embodiment, the wafer temperature changes by about 20 degrees Celsius and the belt temperature changes by about 10 degrees Celsius during the processing.

Figure 12:
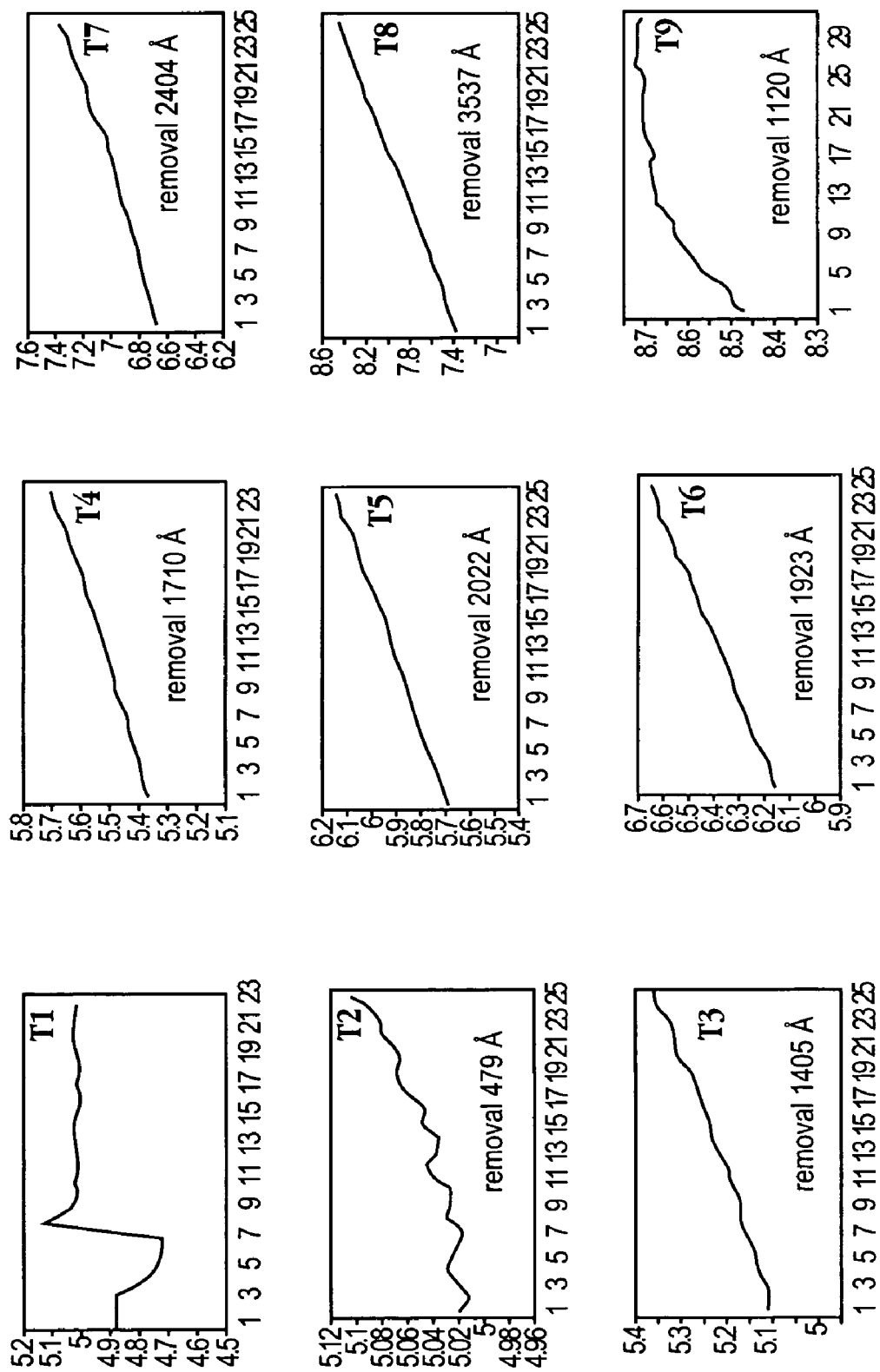
FIG. 12 is a schematic diagram of 30 second time sequences T1–T9 of a CMP process illustrating the removal of a copper film as measured by an eddy current sensor in the wafer carrier in accordance with one embodiment of the invention.

FIG. 12 is a schematic diagram of 30 second time sequences T1–T9 of a CMP process illustrating the removal of a copper film as measured by an eddy current sensor in the wafer carrier in accordance with one embodiment of the invention. Each of time sequences T1–T9 show the ECS signal on the y axis in volts and the time interval in seconds on the x axis. Time sequence T1 illustrates the initiation of the process, while time sequence T2 illustrates the beginning of the removal of the copper film. That is, 479 A of material is removed in time sequence T2. Time sequences T3–T8 illustrate approximate 30 second periods and the associated amount of material removed during the time sequence. Time sequence T9 illustrates the occurrence of the endpoint condition.

Figure 13:
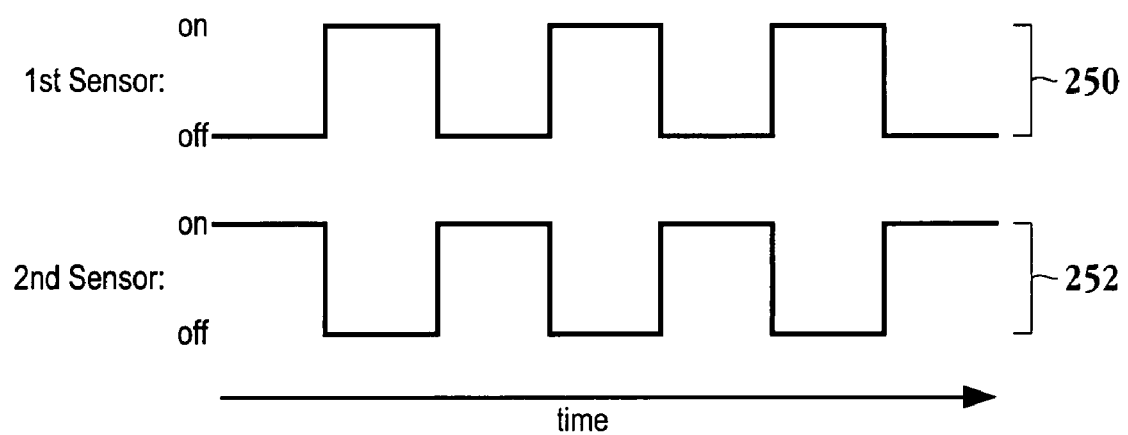
FIG. 13 is a simplified schematic diagram illustrating the duty cycles for a switched scheme applied to two sensors being either off set or coaxial in accordance with one embodiment of the invention.

FIG. 13 is a simplified schematic diagram illustrating the duty cycles for a switched scheme applied to two sensors being either off set or coaxial in accordance with one embodiment of the invention. Here, duty cycle 250, which is associated with the first sensor, alternates relative to duty cycle 252, which is associated with the second sensor. That is, duty cycle 250 is in an "off" state when duty cycle 252 is in an "on" state, and vice-versa. Thus, the cross coupling of the sensors through the substrate being measured is eliminated with this alternating powerizing scheme. It should be appreciated that the alternating powerizing scheme may be referred to as a switching scheme. As will be shown in FIGS. 14A through 16B below, the noise resulting from the switching scheme of FIG. 13 is significantly less as compared to a scheme where both sensors are powered at the same time. It should be appreciated that the first and second sensor may be offset from each other, i.e., the axis for the first sensor is offset from the axis for the second sensor as illustrated in FIGS. 3, 6A, and 7B. Alternatively, the first sensor and the second sensor may be coaxial under this configuration as illustrated in FIG. 5.

Figure 14A:
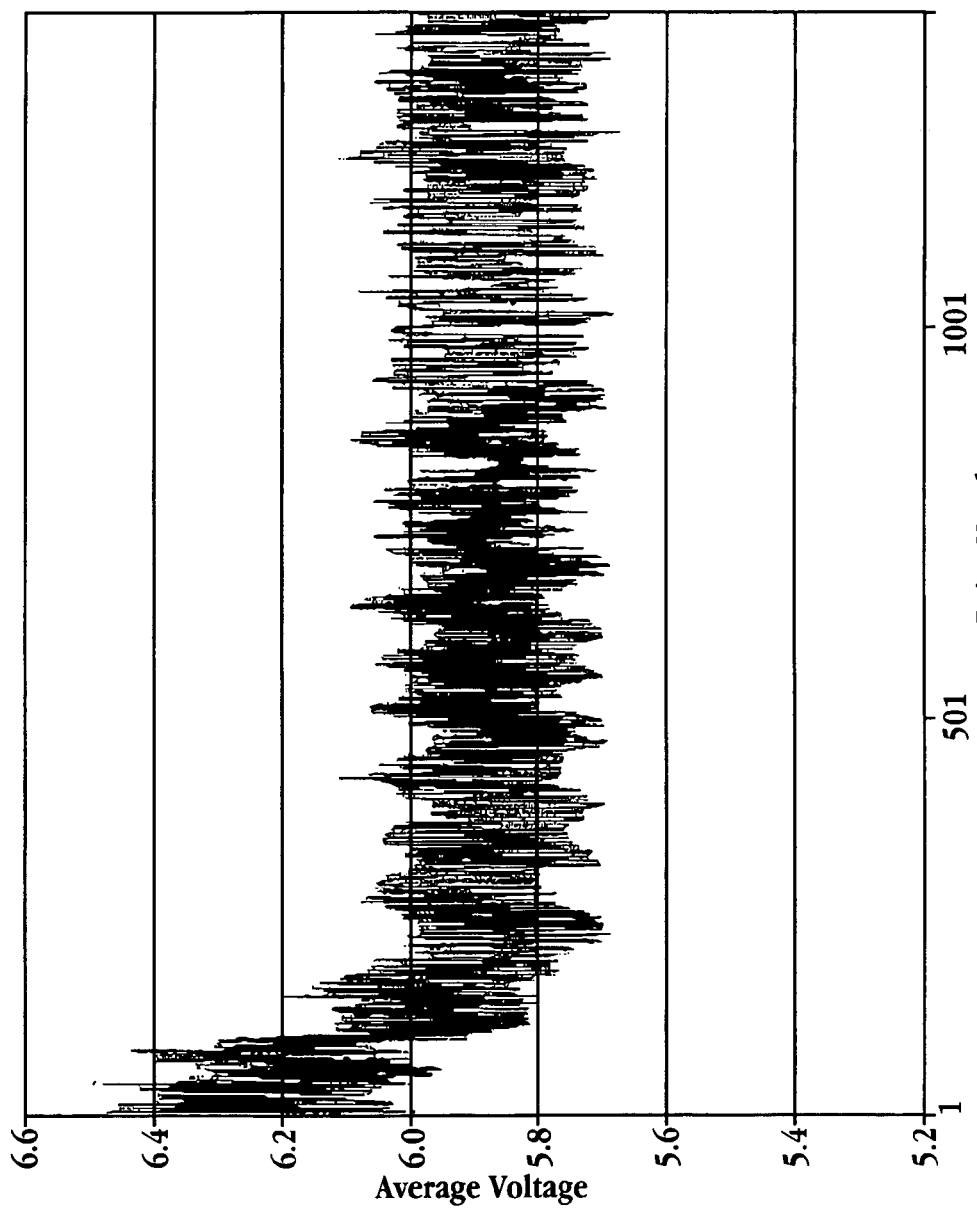
FIGS. 14A and 14B are exemplary graphs illustrating the noise difference between a non-switched powerizing scheme and a switched powerizing scheme in accordance with one embodiment of the invention.
Figure 14B:
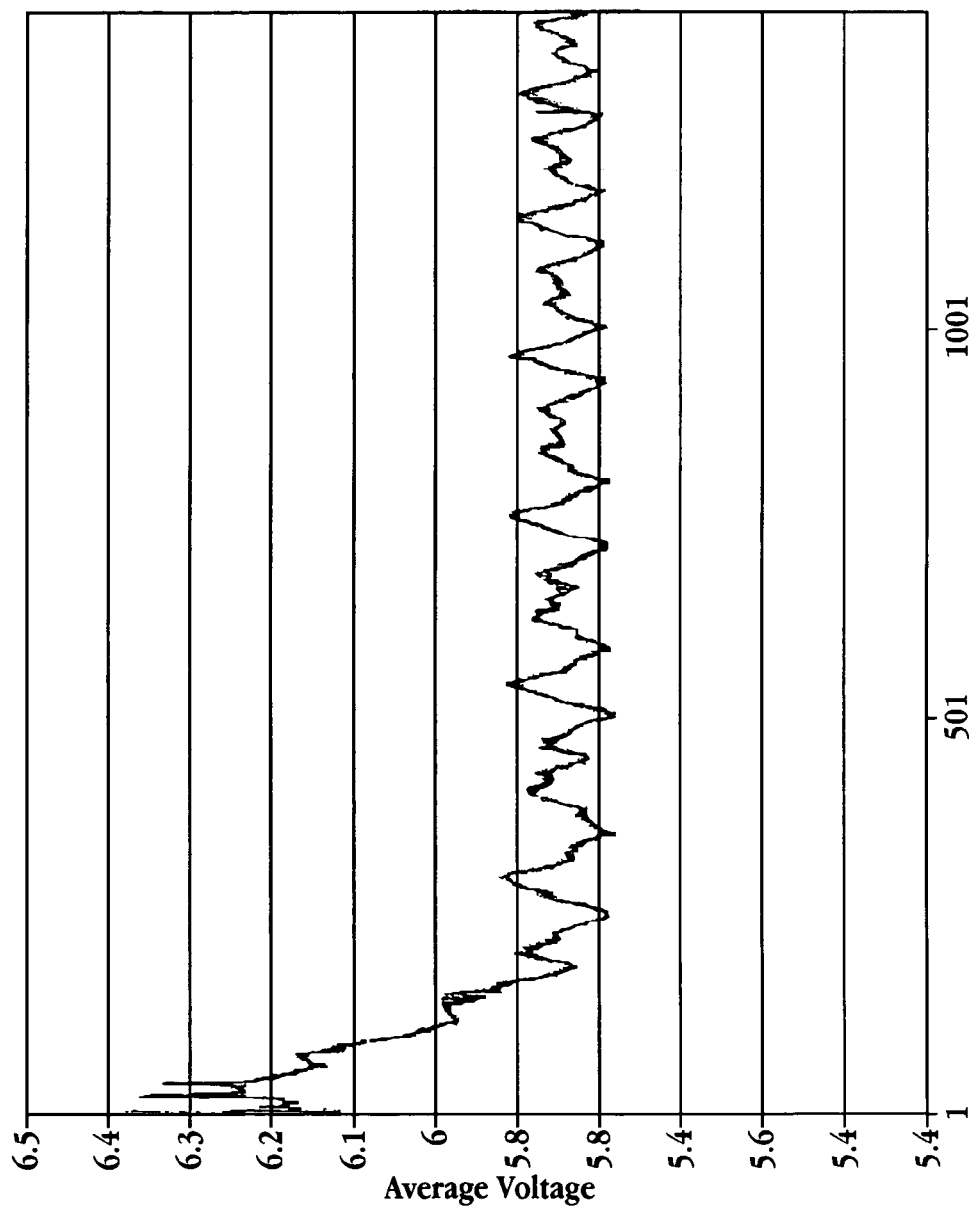

FIGS. 14A and 14B are exemplary graphs illustrating the noise difference between a non-switched powerizing scheme and a switched powerizing scheme in accordance with one embodiment of the invention. FIG. 14A illustrates the voltage reading for a non-switched powerizing scheme. FIG. 14B illustrates a voltage reading for a switched powerizing scheme. As can be seen the noise level associated with FIG. 14A is significantly greater than the noise level associated with FIG. 14B. As mentioned above, the reduction in this noise level is due to the elimination of the coupling of the first and second sensors through the wafer when they are powerized at the same time. Thus, by alternating the powerizing for each of the sensors, a more accurate reading may be obtained with less interference. It should be appreciated that the embodiments described herein enable a single power supply to be used to power the sensors, thereby eliminating errors caused by the different noise characteristics of different power supplies.

Figure 15A:
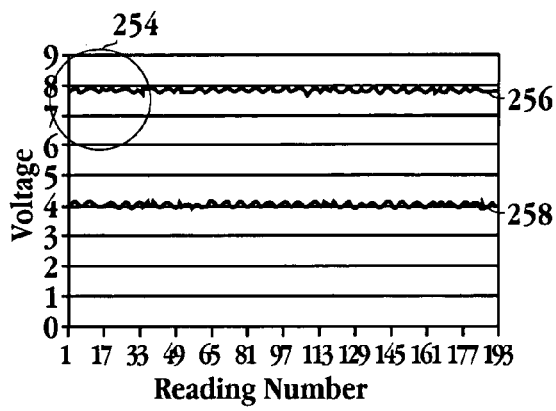
FIGS. 15A and 15B are exemplary graphs illustrating the noise incurred in a non-switching powerizing scheme.
Figure 15B:
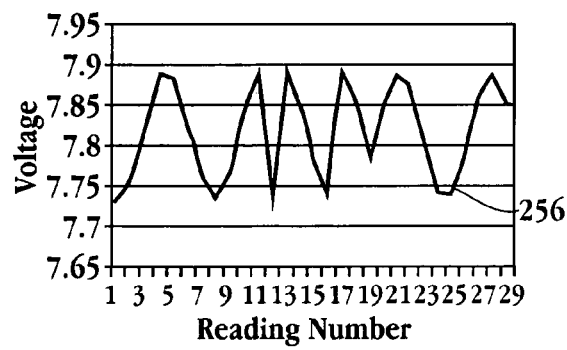
Figure 16A:
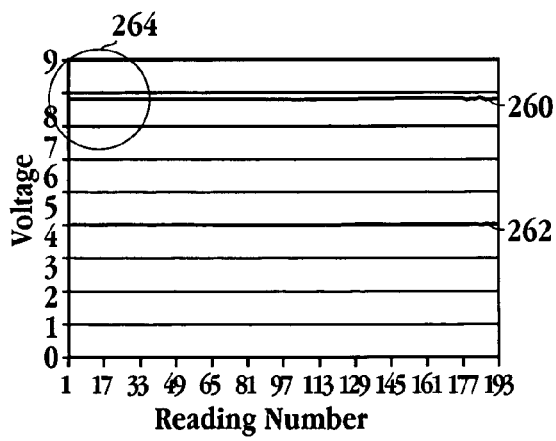
FIGS. 16A and 16B are exemplary graphs representing similar readings to FIGS. 15A and 15B when a switching powerizing scheme is applied to the sensors in accordance with one embodiment of the invention.
Figure 16B:
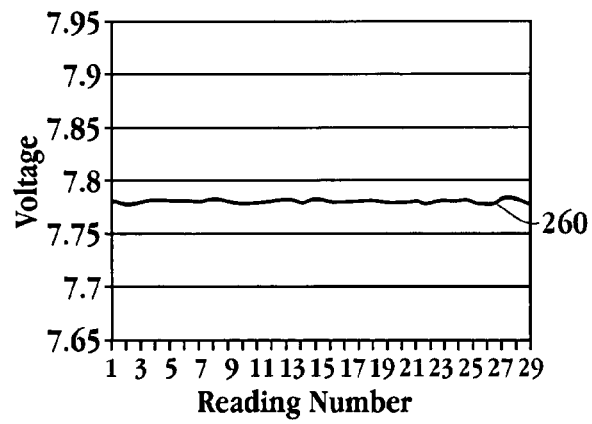

FIGS. 15A and 15B are exemplary graphs illustrating the noise incurred in a non-switching powerizing scheme. Region 254 of FIG. 15A is exploded in FIG. 15B. Here, line 256 represents a signal from an upper sensor, while line 258 represents the voltage signal from a lower sensor. Expanding line 256 in region 254, as demonstrated in FIG. 15B, the voltage readings generally oscillate between 7.7 and 7.9 volts. FIGS. 16A and 16B are exemplary graphs representing similar readings to FIGS. 15A and 15B when a switching powerizing scheme is applied to the sensors in accordance with one embodiment of the invention. Here, line 260 represents a lower sensor voltage reading while line 262 represents an upper sensor voltage reading. As can be seen in FIG. 16A, the voltage readings are relatively flat as compared to the corresponding signals in FIG. 15A. Expanding region 264 in FIG. 16B further illustrates the relative flatness of line 260. Here, the voltage reading for the lower sensor remains fairly stable well within the region of 7.75 and 7.8 volts, as opposed to between 7.7 and 7.9 volts from FIG. 15B.

Figure 17:
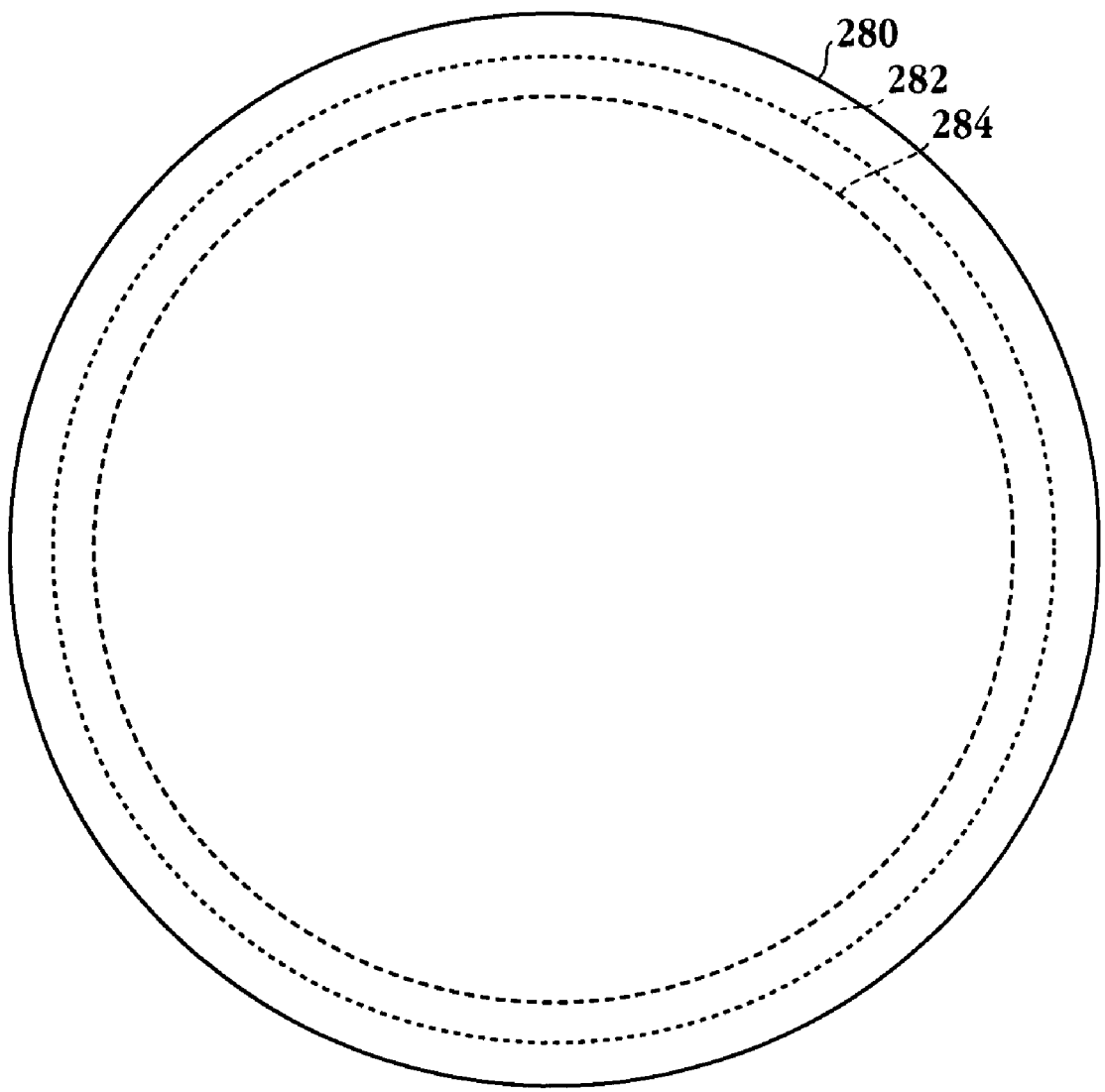
FIG. 17 is a simplified schematic diagram illustrating the edge exclusion improvement in a coaxial configuration in accordance with one embodiment of the invention.

FIG. 17 is a simplified schematic diagram illustrating the edge exclusion improvement in a coaxial configuration in accordance with one embodiment of the invention. Wafer 280 includes two concentric circles illustrated by dash lines 282 and 284. In an offset configuration, the eddy current sensors may be limited to measuring the thickness within the region defined within line 284. However, in a coaxial configuration that region may be expanded to the region defined within line 282. Thus, a greater amount of the wafer 280 will be measured here. For example, where the eddy current sensor probes are approximately 18 millimeters in diameter, the area which may be measured may be expanded by approximately another 9 millimeters. Likewise, where the probes are 12 millimeters in diameter, the area of measurement may be expanded by approximately at least another 6 millimeters.

Figure 18:
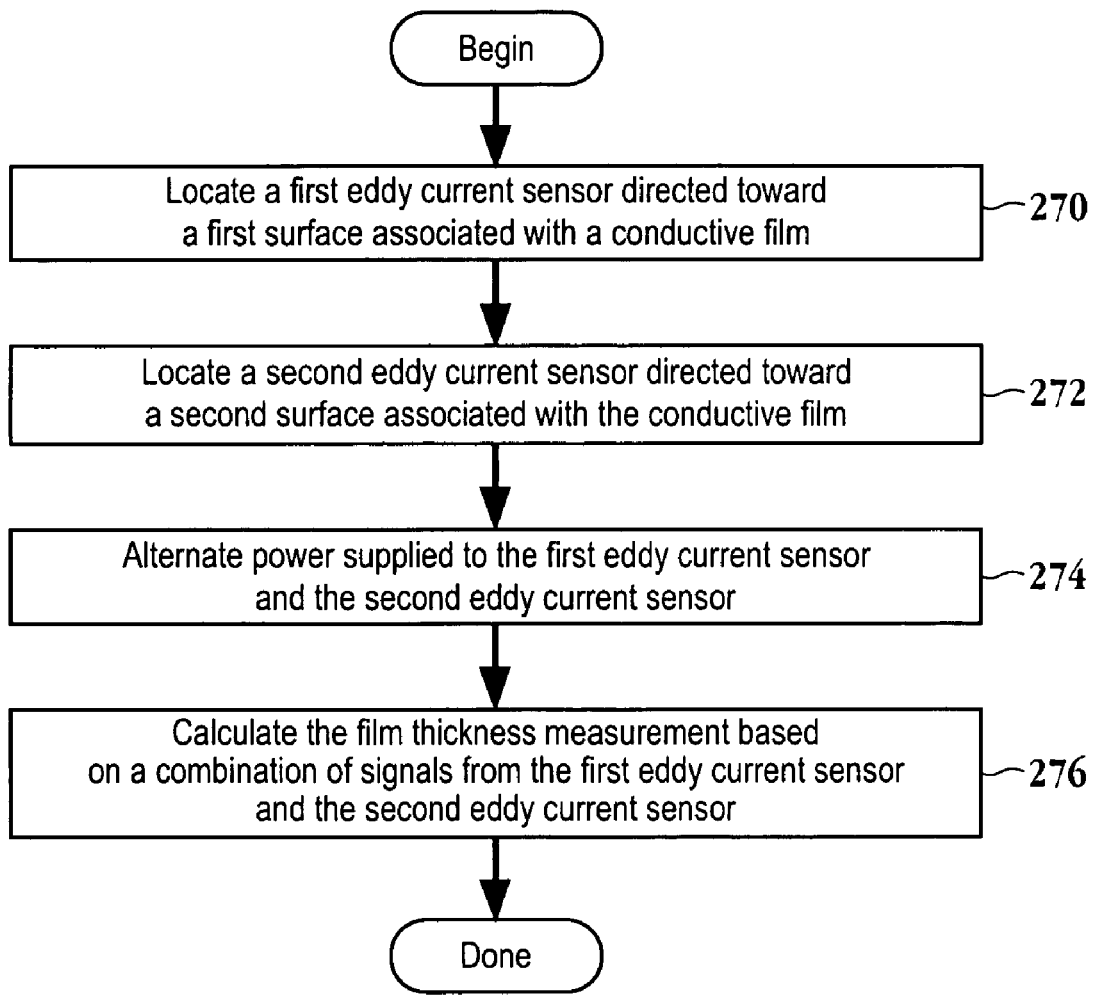
FIG. 18 is a flow chart diagram illustrating method operations for minimizing noise during film thickness measurement in accordance with one embodiment of the invention.

FIG. 18 is a flow chart diagram illustrating method operations for minimizing the inspection spot size and noise during film thickness measurement in accordance with one embodiment of the invention. The method initiates with operation 270 where a first eddy current sensor directed toward a first surface associated with a conductive film is located. The method then proceeds to operation 272 where a second eddy current sensor directed toward a second surface associated with a conductive film is located. Here, the second eddy current sensor and the first eddy current sensor may be directed toward opposing sides of a semiconductor substrate as described above with reference to FIG. 3 and 5. It should be appreciated that the first eddy current sensor and the second eddy current sensor may be coaxial or offset from each other as illustrated herein. When the eddy current sensors are coaxial, the inspection spot size is reduced as compared to the offset configuration. For example, in the offset configuration, the inspection spot size is as large as both diameters of the eddy current sensor probes as illustrated with reference to FIG. 3. However, in the coaxial configuration, the inspection spot size is reduced to a single diameter of the eddy current sensor probes as illustrated with reference to FIG. 5. Furthermore, the eddy current sensors may be located in a processing tool such as a chemical mechanical planarization processing tool or as part of a mapping function associated within aligner station.

The method of FIG. 18 then advances to operation 274 where power supply to the first eddy current sensor and the second eddy current sensor is alternated. That is, the power supply to the first eddy current sensor is "on" while the power supply to the second eddy current sensor is "off". Therefore, only one of the eddy current sensors is powered at a time, thereby eliminating cross-coupling over the eddy current sensors through the substrate. In one embodiment, a delay time can be included into the alternating power scheme. That is, once the first eddy current sensor is powered "on" and then powered "off", a delay period will incur prior to powering the second eddy current sensor "on." The delay period may be one millisecond in one embodiment of the invention, however, any suitable delay period may be applied. The method then moves to operation 276 where the film thickness measurement is calculated based on a combination of signals from the first eddy current sensor and the second eddy current sensor. Since the noise is minimized due to the alternating power scheme the calculated film thickness will be associated with a higher accuracy and precision.

In one embodiment of the invention where the first and second eddy current sensor are coaxial, the opposing eddy current sensor may be configured to appear as a minimum inductive load to the corresponding eddy current sensor. One skilled in the art will appreciate that this may be achieved by including the eddy current sensor in an open loop system. Additionally, the embodiments described herein enable a single power source to supply power to both the first eddy current sensor and the second eddy current sensor, since the power is alternating. Thus, errors introduced when powering the eddy current sensors from multiple power sources, e.g., the noise characteristics of different power sources, are eliminated. In addition, edge exclusion which occurs in an offset configuration may be eliminated by the application of the alternating powerizing scheme in a coaxial configuration. That is, as the sensor head approaches the edge of a wafer, a portion of the probe will be exposed outside of the wafer perimeter and part will be exposed in the wafer perimeter. This exposure results in edge exclusion where the edge region of the wafer is not measured. This edge region may be as large as the diameter of the eddy current sensor Thus, in a coaxial configuration the edge exclusion will be minimized as compared to offset eddy current sensors. That is, the edge exclusion region may be reduced to the radius of the sensor.

In summary, the present invention provides for the determination of an endpoint of a semiconductor fabrication process, such as a CMP process, through a clustered sensor configuration. The clustered sensors allow for the determination of the endpoint and associated removal or deposition rates by initially determining a thickness of a film on the wafer under non-process conditions. In one embodiment, the thickness of the film being measured is between about 0 microns and 2 microns. The determined thickness is provided to a second sensor associated with the process operation in order to calibrate the sensor so that variables from processing conditions that cause error in the thickness measurement are substantially eliminated. It should be appreciated that while the embodiments have been described in terms of a CMP process, the clustered sensor arrays are not limited to a CMP process. For example, the sensors can be used within any semiconductor process that removes or deposits a layer or film on a substrate, such as etch and deposition processes. In addition, a switched power scheme is defined for the minimization of noise. The switched power scheme eliminates the coupling of the sensors through the substrate, which occurs when the opposing sensors are powered at the same time. When the sensors are located in a coaxial configuration, the switched powerizing scheme, along with the minimization of the opposing sensor to appear as an inductive load through the incorporation of an open loop system, the degree of edge exclusion is reduced.

The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. A method for minimizing inspection spot size and noise during film thickness measurement, comprising:

locating a first eddy current sensor directed toward a first surface of a substrate associated with a conductive film;

locating a second eddy current sensor directed toward a second surface of the substrate associated with the conductive film, the second surface opposing the first surface;

alternating power supplied to the first eddy current sensor and the second eddy current sensor, such that the first eddy current sensor is powered while the second eddy current sensor is not powered and the first eddy current sensor is not powered while the second eddy current sensor is powered; and calculating the film thickness measurement based on a combination of signals from the first eddy current sensor and the second eddy current sensor.

2. The method of claim 1, wherein the method operation of locating a second eddy current sensor directed toward a second surface associated with the conductive film includes, offsetting an axis of the first eddy current sensor from an axis of the second eddy current sensor.

3. The method of claim 2, wherein the method operation of alternating power supplied to the first eddy current sensor and the second eddy current sensor includes, a) supplying power to the first eddy current sensor;
b) terminating power supplied to the first eddy current sensor;
c) waiting for a delay period;
d) supplying power to the second eddy current sensor;
e) terminating power supplied to the second eddy current sensor; and
f) waiting for the delay period.

4. The method of claim 3, further comprising:

repeating steps a)–f) for each location being measured.

5. The method of claim 1, wherein the method operation of locating a second eddy current sensor directed toward a second surface associated with the conductive film includes, aligning the first eddy current sensor to be coaxial with the second eddy current sensor.

6. The method of claim 5, wherein the method operation of alternating power supplied to the first eddy current sensor and the second eddy current sensor includes, configuring both of the first eddy current sensor and the second eddy current sensor so that an appearance as an inductive load in minimized when the respective eddy current sensor is passive.

7. The method of claim 6, wherein the method operation of configuring both of the first eddy current sensor and the second eddy current sensor so that an appearance as an inductive load in minimized when the respective eddy current sensor is passive includes, incorporating both of the first eddy current sensor and the second eddy current sensor into an open loop.

8. The method of claim 1, further comprising:

supplying power to both the first eddy current sensor and the second eddy current sensor from a single power supply; and repeating the alternating of the power such that both the first and the second eddy current sensors are powered at alternating times for each location.

* * * * *